US012670249B2

(12) United States Patent
van Vredendaal et al.

(10) Patent No.: US 12,670,249 B2
(45) Date of Patent: Jun. 30, 2026

(54) SYSTEMS AND METHODS FOR DETECTING REPLAY ATTACKS TO AN AUTHENTICATION SYSTEM

(71) Applicant: NXP B.V., Eindhoven (NL)

(72) Inventors: Christine van Vredendaal, Veldhoven (NL); Nikita Veshchikov, Brussels (BE); Marc Vauclair, Overijse (BE)

(73) Assignee: NXP B.V., Eindhoven (NL)

( * ) Notice: Subject to any disclaimer, the term of this patent is extended or adjusted under 35 U.S.C. 154(b) by 238 days.

(21) Appl. No.: 18/378,599

(22) Filed: Oct. 10, 2023

(65) Prior Publication Data

US 2025/0117474 A1     Apr. 10, 2025

(51) Int. Cl.
*G06F 21/55* (2013.01)
*G06F 21/32* (2013.01)
*G06F 21/54* (2013.01)

(52) U.S. Cl.
CPC ............ *G06F 21/554* (2013.01); *G06F 21/32* (2013.01); *G06F 21/54* (2013.01)

(58) Field of Classification Search
CPC ......... G06F 21/554; G06F 21/32; G06F 21/54
See application file for complete search history.

(56) References Cited

U.S. PATENT DOCUMENTS

| | | | |
|---|---|---|---|
| 11,200,497 B1 | 12/2021 | Yan et al. | |
| 11,210,375 B2 * | 12/2021 | Streit | G06V 40/45 |
| 11,328,045 B2 | 5/2022 | Yan et al. | |
| 11,682,251 B1 * | 6/2023 | Goetz | G07C 9/27 |
| | | | 340/5.7 |
| 2018/0300487 A1 * | 10/2018 | Gupta | G06N 7/01 |
| 2019/0065716 A1 | 2/2019 | Lavin | |
| 2019/0272361 A1 * | 9/2019 | Kursun | H04L 67/535 |
| 2020/0372513 A1 * | 11/2020 | Prasad | G06F 21/32 |
| 2021/0232667 A1 * | 7/2021 | van Vredendaal | |
| | | | G06V 40/1365 |
| 2022/0327189 A1 * | 10/2022 | Belli | G06F 21/32 |

FOREIGN PATENT DOCUMENTS

| | | |
|---|---|---|
| CN | 113837376 A | 12/2021 |
| EP | 3985574 A1 | 4/2022 |

OTHER PUBLICATIONS

An Introduction to biometric and Fingerprint on Card technology NXP (Year: 2019).*
Jagielski, Matthew et al. "High Accuracy and High Fidelity Extraction of Neural Networks", Mar. 3, 2020, 18 pgs.
(Continued)

*Primary Examiner* — Linglan Edwards
*Assistant Examiner* — Jacob Benedict Knackstedt

(57) ABSTRACT

A REE can approve or deny authentication based on a sensor output signal and a secure element (SE) operatively coupled to the REE can detect a replay attack. A feature extractor produces a feature vector from the sensor output signal. The feature vector can be used to authenticate a user. Detecting the replay attack can include storing previous feature vectors, sending a security breached signal to the REE in response to determining that the feature vector equals one of the previous feature vectors, and storing the feature vector as one of the previous feature vectors. The REE can deny authentication in response to receiving the security breached signal.

20 Claims, 9 Drawing Sheets

(56)          References Cited

OTHER PUBLICATIONS

Abbasi, Sajjad et al. "Modeling Teacher-Student Techniques in Deep Neural Networks for Knowledge Distillation", Dec. 31, 2019, 6 pgs.
NXP, "What's next for payment cards? an introduction to biometric authentication and Fingerprint on Card technology", Nov. 2019, 19 pgs.
Blalock, Davis et al. "What is the state of Neural Network Pruning?", 2020, 18 pgs.
NXP, "Security for Biometric Authentication", Oct. 15, 2020, 26 pgs.

* cited by examiner

100

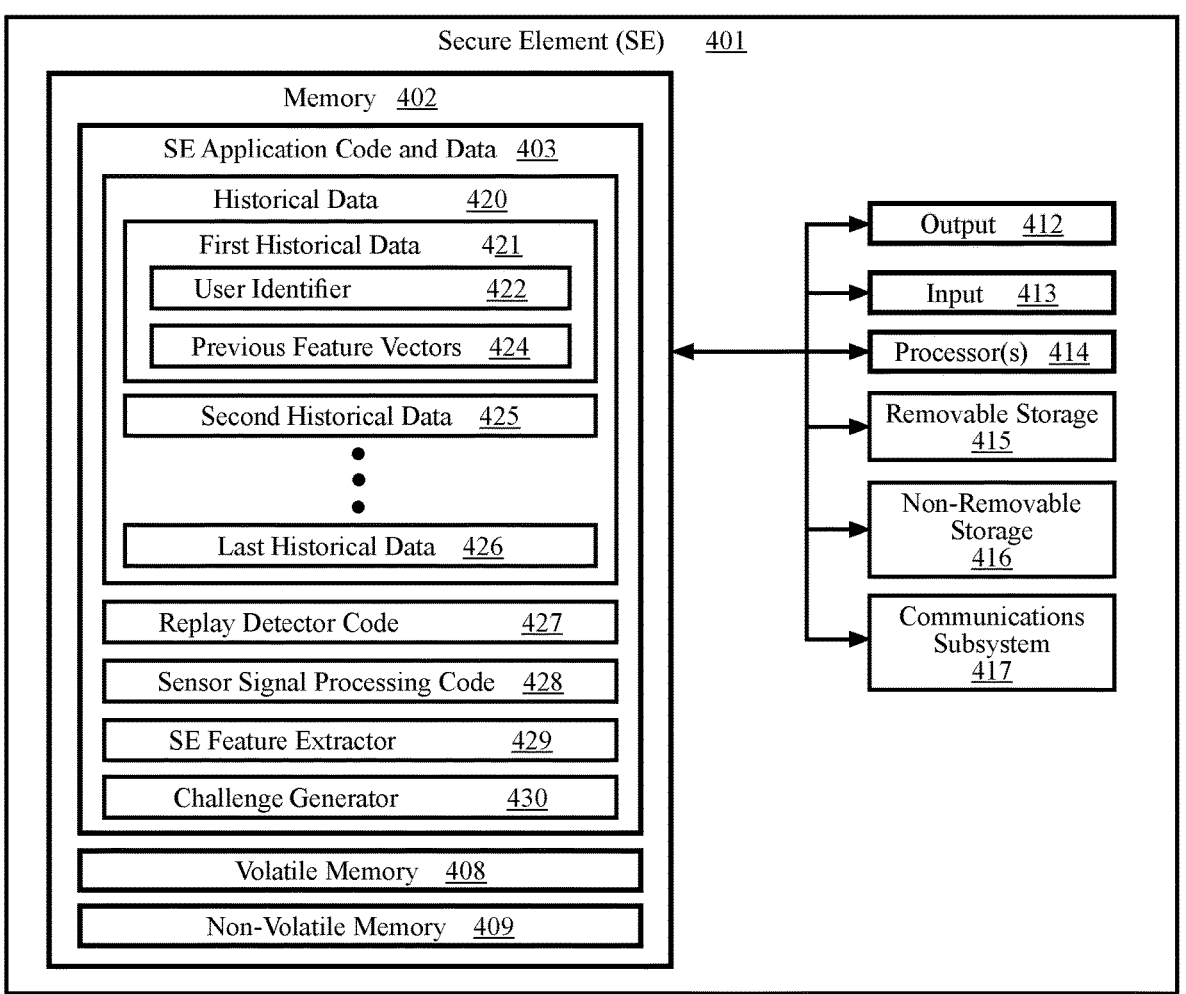

Secure Element (SE)    401

Memory    402

SE Application Code and Data    403

Historical Data    420

First Historical Data    421

User Identifier    422

Previous Feature Vectors    424

Second Historical Data    425

Last Historical Data    426

Replay Detector Code    427

Sensor Signal Processing Code    428

SE Feature Extractor    429

Challenge Generator    430

Volatile Memory    408

Non-Volatile Memory    409

Output    412

Input    413

Processor(s)    414

Removable Storage    415

Non-Removable Storage    416

Communications Subsystem    417

FIG. 4

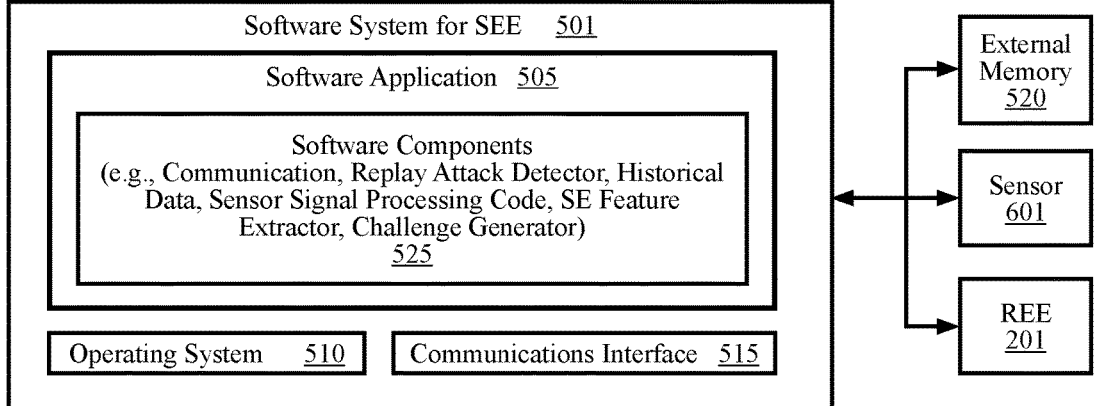

Software System for SEE    501

Software Application    505

Software Components
(e.g., Communication, Replay Attack Detector, Historical Data, Sensor Signal Processing Code, SE Feature Extractor, Challenge Generator)
525

Operating System    510

Communications Interface    515

External Memory    520

Sensor    601

REE    201

FIG. 5 sensor output signal
with challenge added
609 sensor output signal
with challenge added
609

1500

1600

SYSTEMS AND METHODS FOR DETECTING REPLAY ATTACKS TO AN AUTHENTICATION SYSTEM

TECHNICAL FIELD

The systems and methods relate to sensors, biometric sensors, authentication, rich execution environment (REE) devices and systems, secure element (SE) devices and systems, and to replay attacks. More specifically, the system and methods relate using a SE and a REE to approve or deny authentication where detection of a replay attack results in denying authentication.

BACKGROUND

Sensors, such as biometric sensors are used to augment security by helping detect an aspect of a user being approved or denied authentication based on a sensor output signal. For example, cameras can be used for facial recognition, fingerprint sensors can be used for fingerprint recognition, palm readers can be used for palm recognition, etc. A rich execution environment, such as a laptop computer may therefore use a sensor output signal for authenticating a person.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

An aspect of the subject matter described in this disclosure can be implemented by a system. The system can include a rich execution environment (REE) configured to approve or deny authentication based on a sensor output signal, a feature extractor configured to produce a feature vector from the sensor output signal, and a secure element operatively coupled to the REE and configured to detect a replay attack. Detecting the replay attack can include storing a plurality of previous feature vectors, sending a security breached signal to the REE in response to determining that the feature vector equals one of the previous feature vectors, and storing the feature vector as one of the previous feature vectors. The REE can be configured to deny authentication in response to receiving the security breached signal.

Another aspect of the subject matter described in this disclosure can be implemented by a system. The system can include a sensor configured to produce a sensor output signal, an interface circuit configured to transform the sensor output signal to produce a transformed sensor output signal, a rich execution environment (REE) configured to use the sensor output signal to approve or to deny authentication, a feature extractor configured to produce a feature vector from the sensor output signal or the transformed sensor output signal, and a secure element operatively coupled to the REE and configured to detect a replay attack. Detecting the replay attack can include storing a plurality of previous feature vectors, sending a security breached signal to the REE in response to determining that the feature vector equals one of the previous feature vectors, and storing the feature vector as one of the previous feature vectors. The REE can be configured to deny authentication in response to receiving the security breached signal.

Yet another aspect of the subject matter described in this disclosure can be implemented in a method for denying authentication in response to detecting a replay attack. The method can include producing a feature vector from a sensor output signal, storing, by a secure element, a plurality of previous feature vectors, sending, by the secure element, a security breached signal to a REE in response to determining that the feature vector equals one of the previous feature vectors, storing, by the secure element, the feature vector as one of the previous feature vectors, and approving or denying authentication, by the REE, based on the sensor output signal, wherein the REE is configured to deny authentication in response to receiving the security breached signal.

In some implementations of the methods and devices, the REE is configured to implement the feature extractor and to send the feature vector to the secure element in response to receiving the sensor output signal. In some implementations of the methods and devices, the secure element is configured to receive the sensor output signal and to implement the feature extractor. In some implementations of the methods and devices, the devices may further include an interface circuit operatively coupled to the secure element and configured to condition the sensor output signal for the secure element, wherein conditioning the sensor output signal for the secure element includes receiving the sensor output signal, transforming the sensor output signal to produce a transformed sensor output signal, and providing the transformed sensor output signal to the secure element, wherein the secure element is configured to receive the sensor output signal and to implement the feature extractor. In some implementations of the methods and devices, the devices may further include a memory operatively coupled to the secure element, and wherein the secure element is configured to store the previous feature vectors in the memory. In some implementations of the methods and devices, the secure element includes a memory, and wherein the secure element is configured to store the previous feature vectors in the memory. In some implementations of the methods and devices, the REE is configured to approve authentication in response to determining that the feature vector does not equal any of the previous feature vectors and in response to authenticating the sensor output signal. In some implementations of the methods and devices, the devices may further include a biometric sensor configured to produce the sensor output signal.

In some implementations of the methods and devices, the secure element includes the feature extractor, and the feature extractor is configured to produce the feature vector from the transformed sensor output signal. In some implementations of the methods and devices, the interface circuit is operatively coupled to the sensor and to the secure element. In some implementations of the methods and devices, the sensor is configured to add a challenge to the sensor output signal and to communicate the challenge to the secure element, the REE is configured to produce a challenge indicator from the challenge, the secure element is configured to use the challenge to confirm the challenge indicator, and the secure element is configured to send the security breached signal to the REE in response to determining that the challenge does not match the challenge indicator. In some implementations of the methods and devices, the devices may further include a memory operatively coupled to the secure element, and wherein the secure element is configured to store the previous feature vectors in the memory. In some implementations of the methods and devices, the REE includes the feature extractor, and the feature extractor is configured to produce the feature vector from the sensor output signal and to provide the feature vector to the secure element. In some implementations of the methods and devices, the sensor is a biometric sensor. In some implementations of the methods and devices, the biometric sensor is a camera. In some implementations of the methods and devices, the sensor includes the interface circuit.

In some implementations of the methods and devices, the methods may further include producing, by a sensor, the sensor output signal, and transforming, by an interface circuit, the sensor output signal to produce a transformed sensor output signal that is provided to the secure element, wherein the secure element uses the transformed sensor output signal to produce the feature vector. In some implementations of the methods and devices, the REE is configured to approve authentication in response to determining that the feature vector does not equal any of the previous feature vectors and in response to authenticating the sensor output signal.

These and other aspects will become more fully understood upon a review of the detailed description, which follows. Other aspects and features will become apparent to those of ordinary skill in the art, upon reviewing the following description of specific examples in conjunction with the accompanying figures. While features may be discussed relative to certain examples and figures below, any example may include one or more of the advantageous features discussed herein. In other words, while one or more examples may be discussed as having certain advantageous features, one or more of such features may also be used in accordance with the various examples discussed herein. In similar fashion, while the examples may be discussed below as devices, systems, or methods, the examples may be implemented in various devices, systems, and methods.

BRIEF DESCRIPTION OF THE DRAWINGS

FIG. 4 is a high-level block diagram illustrating a secure element (SE), according to some aspects.

FIG. 5 is a high-level block diagram illustrating a software system for a SE, according to some aspects.

4

Figure 11:
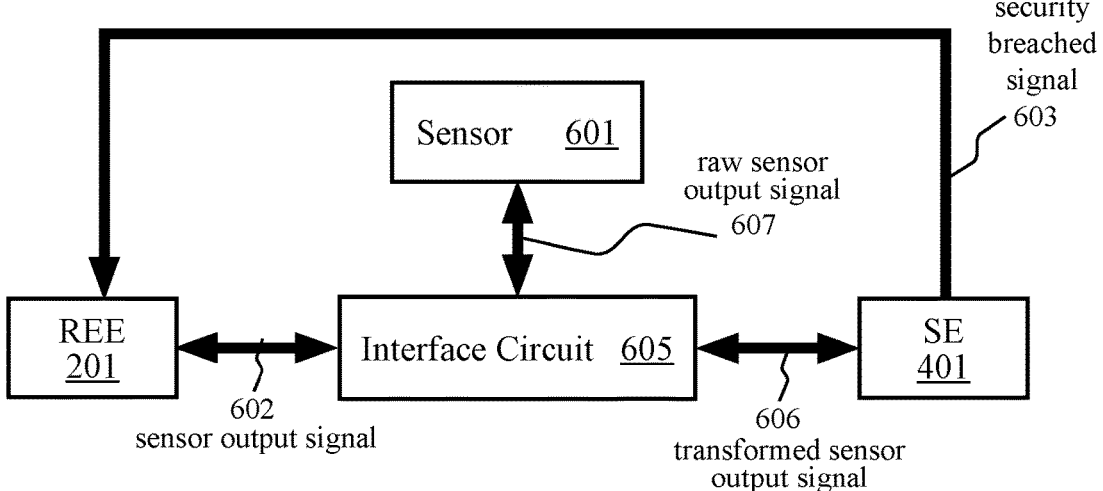

FIG. 11 is a high level block diagram illustrating an interface circuit that can provide a sensor output signal to an REE and can provide a transformed sensor output signal to an SE, according to some aspects.

Figure 12:
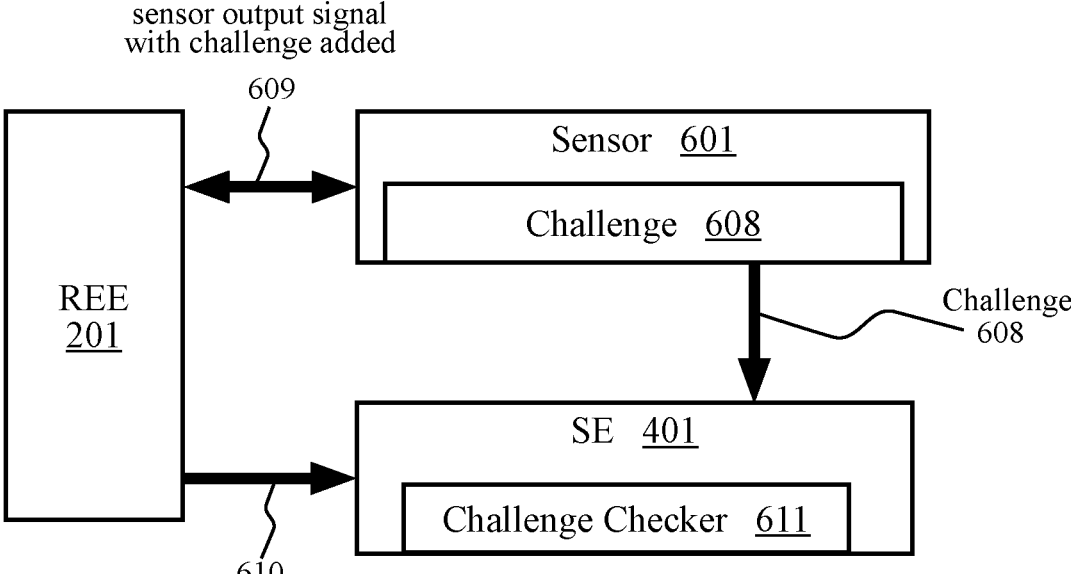

FIG. 12 is a high level block diagram illustrating a sensor that can add a challenge to the sensor output signal such that the SE can confirm the challenge, according to some aspects.

Figure 13:
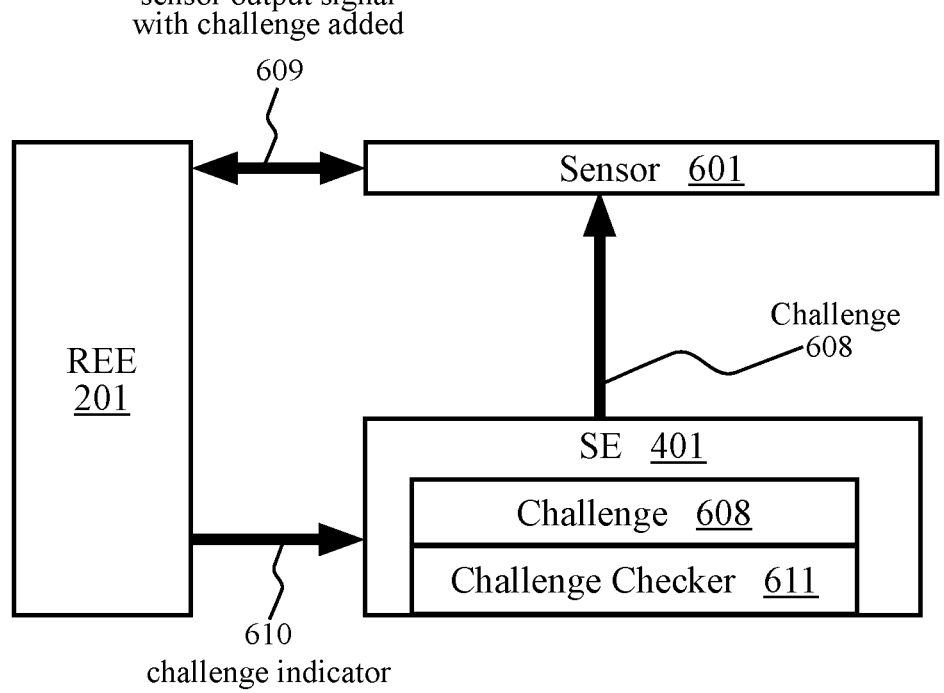

FIG. 13 is a high level block diagram illustrating a SE that can provide a challenge to the sensor such that the sensor can add the challenge to the sensor output signal, according to some aspects.

Figure 14:
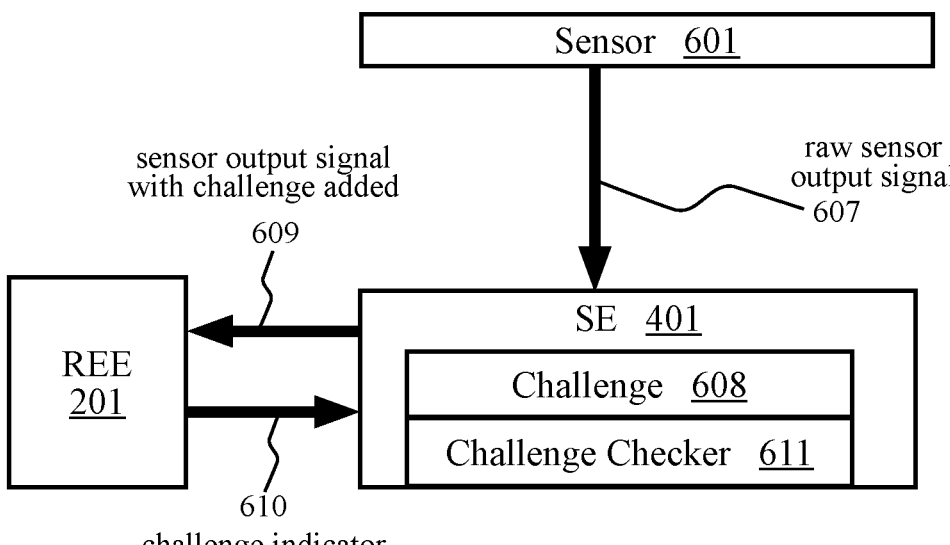

FIG. 14 is a high level block diagram illustrating a SE that adds a challenge to a sensor output signal and later confirms the challenge, according to some aspects.

Figure 15:
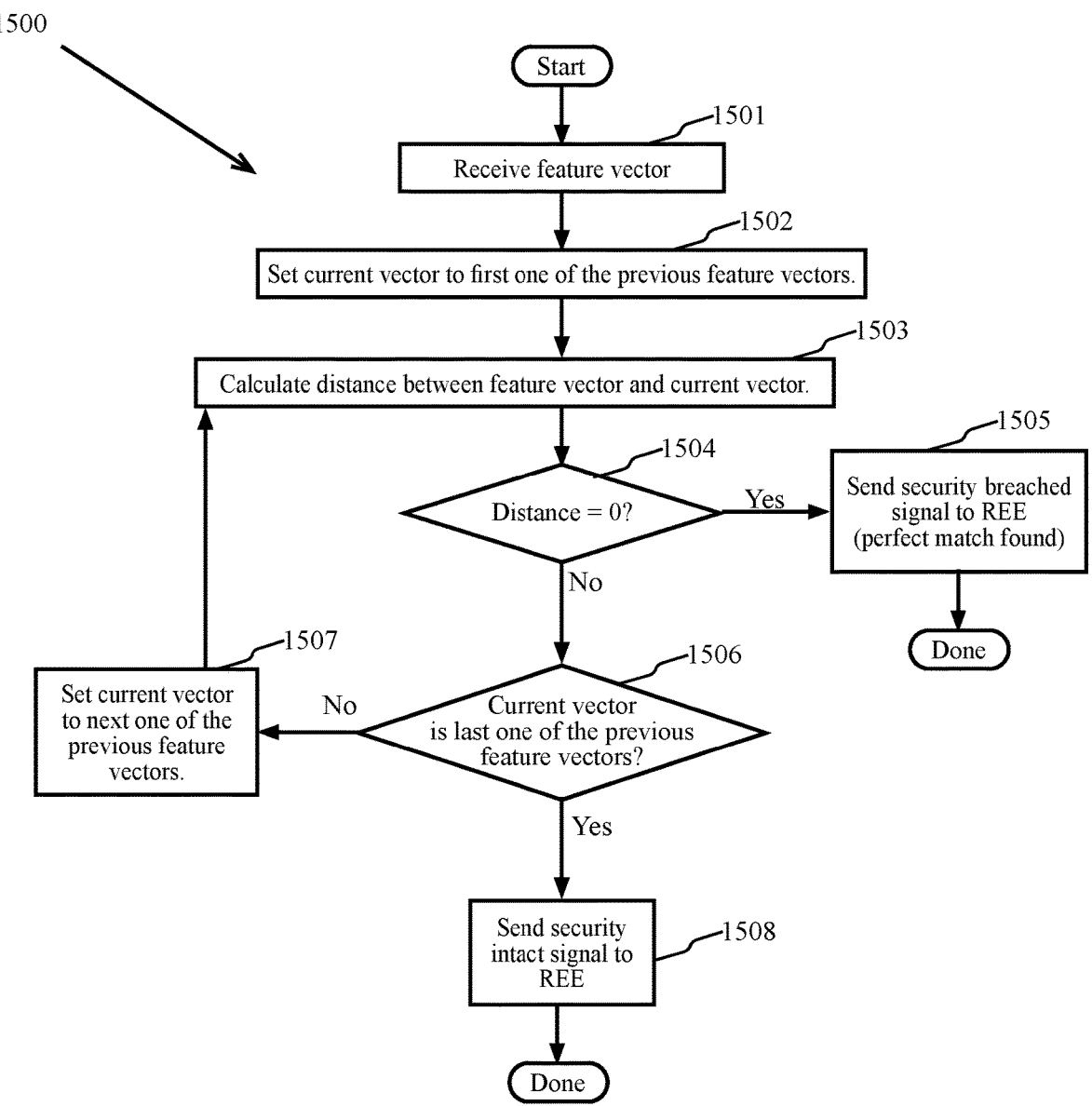

FIG. 15 a high level flow diagram illustrating a process for detecting a perfect match between a feature vector and a previous feature vector, according to some aspects.

Figure 16:
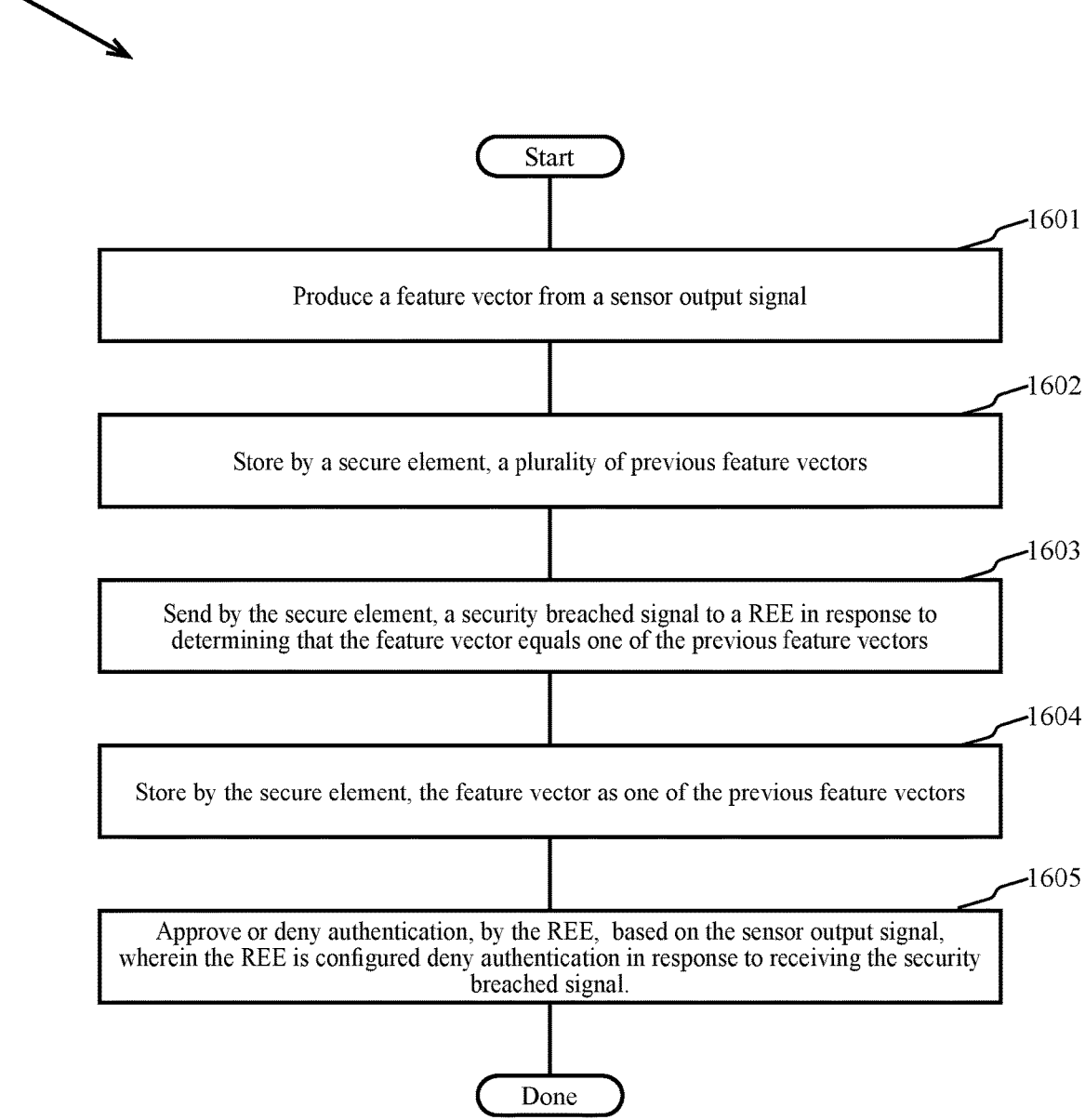

FIG. 16 is a high-level flow diagram illustrating a method for detecting replay attacks to an authentication system, according to some aspects.

Throughout the description, similar reference numbers may be used to identify similar elements.

DETAILED DESCRIPTION

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various examples. While the various aspects of the examples are presented in drawings, the drawings are not necessarily drawn to scale unless specifically indicated.

Systems and methods that implement aspects may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one example. Thus, discussions of the features and advantages, and similar language, throughout this specification may, but do not necessarily, refer to the same example.

Furthermore, the described features, advantages, characteristics, and aspects may be combined in any suitable manner in one or more systems or methods. One skilled in the relevant art will recognize, in light of the description herein, that one example may be practiced without one or more of the specific features or advantages of another example. In other instances, additional features and advantages may be recognized in one example that may not be present in all the examples.

Reference throughout this specification to "one example", "an example", or similar language means that a particular feature, structure, or characteristic described in connection with the indicated example is included in at least one example. Thus, the phrases "in one example", "in an example", and similar language throughout this specification may, but do not necessarily, all refer to the same example.

Authentication systems can use sensor output signals, such as biometric sensor output signals from biometric sensors, to recognize a person who is attempting authentication. The authentication process can involve computing a feature vector from a sensor output signal and then comparing the feature vector to a feature template for the person. Authentication of the person can be approved in response to determining that the feature vector is similar to the feature template and can be otherwise denied. Cameras, fingerprint sensors, and palm readers are examples of biometric sensors.

Replay attacks can defeat such authentication systems. A replay attack occurs when an attacker records information that led to a successful authentication and later performs a bogus authentication attempt by reusing that information in order to trick the authentication system into approving the bogus authentication attempt. For example, the attacker may record the sensor output signal of a fingerprint reader when a valid user is authenticated. The attacker may later inject (e.g., unplug the sensor and plug in a replay device) that recorded sensor output signal as part of a replay attack. Another example is that the attacker may produce a latex fingertip that duplicates a valid user's fingerprint and present that latex fingertip to the fingerprint reader.

A solution is to detect repetitions of the sensor output signal, thereby detecting a possible replay attack. Repetitions of the sensor output signal may indicate a replay attack because people are not frozen in time. As such, sensor output signals from a biometric sensor measuring an aspect of a person should change over time. Detecting a replay attack includes computing a feature vector the sensor output signal and then comparing the feature vector to previous feature vectors. A replay attack, specifically a data reinjection attack, is detected when the feature vector equals one of the previous feature vectors. Alternatively, a feature vector that is overly close to one of the previous feature vectors may signal a replay attack. For example, the feature vectors that result from reading a latex fingerprint may not always be equal, but will be closer to one another than the feature vectors that result from reading a human fingerprint.

A further aspect of the solution is that the comparisons to previous feature vectors can be performed by a secure element (SE) instead of in a rich execution environment (REE), thereby mitigating the risk that the REE is compromised. It is well known that a REE, such as a laptop computer, is far easier to compromise than an SE because the REE is designed for usability whereas the SE can be designed for security and produced in a secure environment. Those practiced in secure computing are familiar with SEs and the supply chain aspects that ensure a SE is secure.

Aspects of REEs and SEs are disclosed in U.S. Pat. No. 11,328,045 titled "BIOMETRIC SYSTEM AND METHOD FOR RECOGNIZING A BIOMETRIC CHARACTERISTIC IN THE BIOMETRIC SYSTEM" that issued on May 10, 2022. U.S. Pat. No. 11,328,045 is herein incorporated by reference in its entirety.

Figure 1:
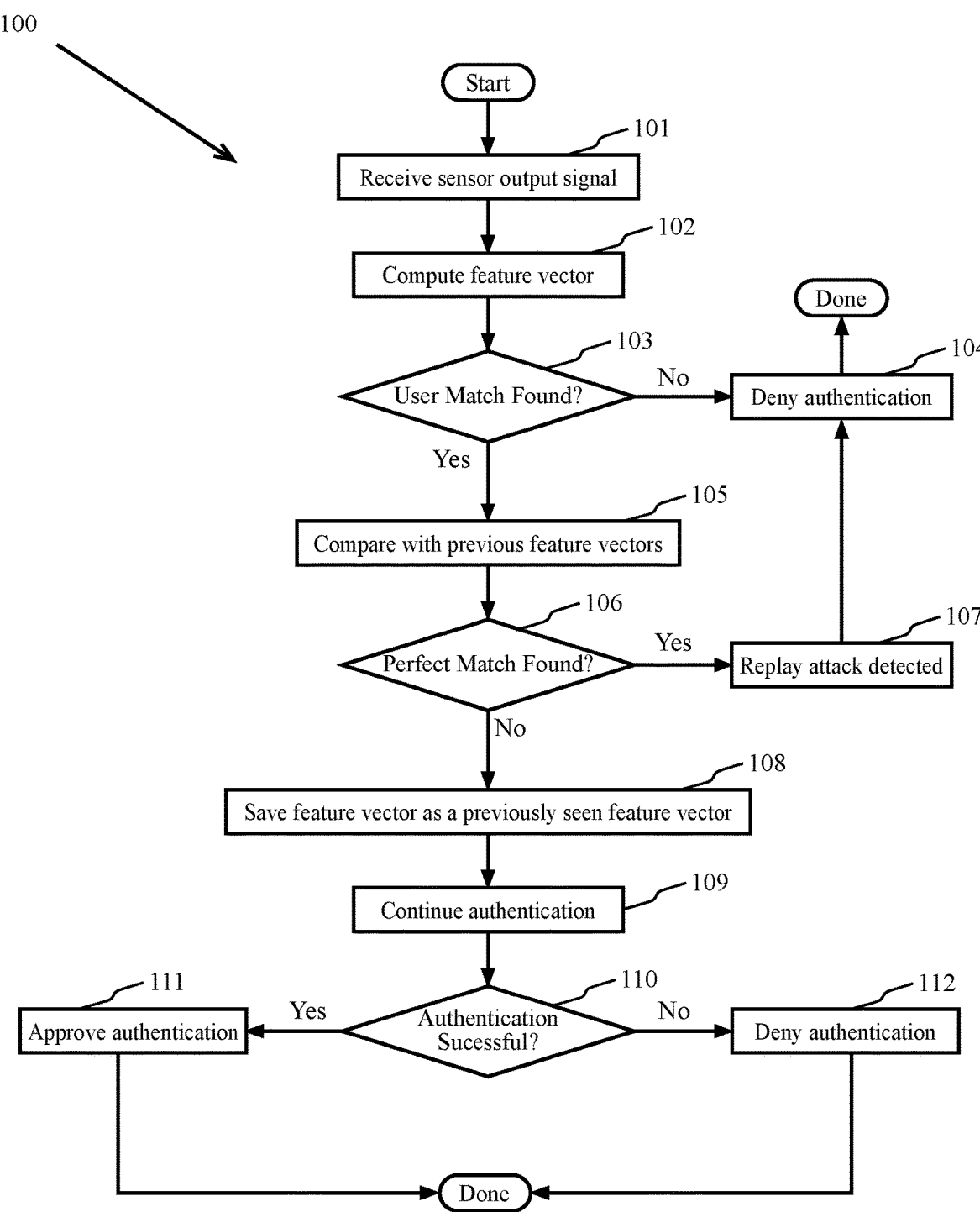
FIG. 1 is a high-level flow diagram illustrating an authentication process that is resistant to replay attacks, according to some aspects.

FIG. 1 is a high-level flow diagram illustrating an authentication process 100 that is resistant to replay attacks, according to some aspects. After the start, at block 101 a sensor output signal is received. For example, a user may have used the sensor in an authentication attempt such that the sensor produces the sensor output signal. At block 102, the sensor output signal is used to compute a feature vector. For example, a feature extractor can compute feature vectors from sensor output signals. Those familiar with pattern recognition and machine learning are familiar with a plethora of techniques and algorithms that feature extractors can use for calculating feature vectors from input signals. Examples of such techniques/algorithms include the discrete Fourier transform, the Hadamard transform, wavelet transforms, principal components, and more. Neural networks have also been used for calculating feature vectors from signals. At decision block 103, the process can determine whether a user match is found. For example, a database can include feature templates for all the authorized users. The feature vector can be compared to the feature templates stored in the database. If the feature vector matches one of the feature templates, then a user match is found. In another example, the user may have already provided a user identifier such that the feature vector can be compared to a feature template associated with that user identifier. Those familiar with pattern recognition and machine learning are familiar with a plethora of techniques and algorithms for determining whether a feature vector matches a feature template. For example, a distance measure (Euclidean distance, Mahalanobis distance, etc.) can be calculated and a user match inferred when the distance is less than a threshold. Neural networks have also been used to determine whether or not a feature vector matches a feature template. The process can move to block 105 if a user match is found at decision block 103 and can otherwise move to block 104. At block 104, authentication is denied before the process is done.

At decision block 106, the process can compare the feature vector with previous feature vectors to determine whether a perfect match is found. The previous feature vectors can be the feature vectors calculated at block 102 during previous successful authentication attempts. For example, the previous feature vectors can be the feature vectors calculated at block 102 during the ten most recent successful authentication attempts. A perfect match is found when the feature vector is identical to one of the previous feature vectors. The process can move to block 107 if a perfect match is found at decision block 106 and otherwise move to block 108. At block 107, a replay attack is detected and the process denies authentication by moving to block 104. At block 108 the feature vector can be saved as a previous feature vector. Here, the feature vector may replace one of the previous feature vectors due to limited memory for storing feature vectors. For example, the feature vector may replace the oldest previous feature vector. At block 109, the process can continue authentication. For example, further checks may be implemented before authentication is approved. One example of a further check is verifying a user supplied password. Another example of a further check occurs when user permissions allow the user to access specific data or secured areas but do not allow the user to access other data or secured areas. The checks performed as block 109 may confirm that the user is allowed access to the data or secured area being secured via the sensor that produced the sensor output signal. At decision block 110, the process can determine whether the further checks implemented at block 109 indicate that authentication is successful. The process can move to block 111 if authentication is successful at decision block 110 and otherwise move to block 112. At block 111, the process can approve authentication of the user. At block 112, the process can deny authentication of the user.

Figure 2:
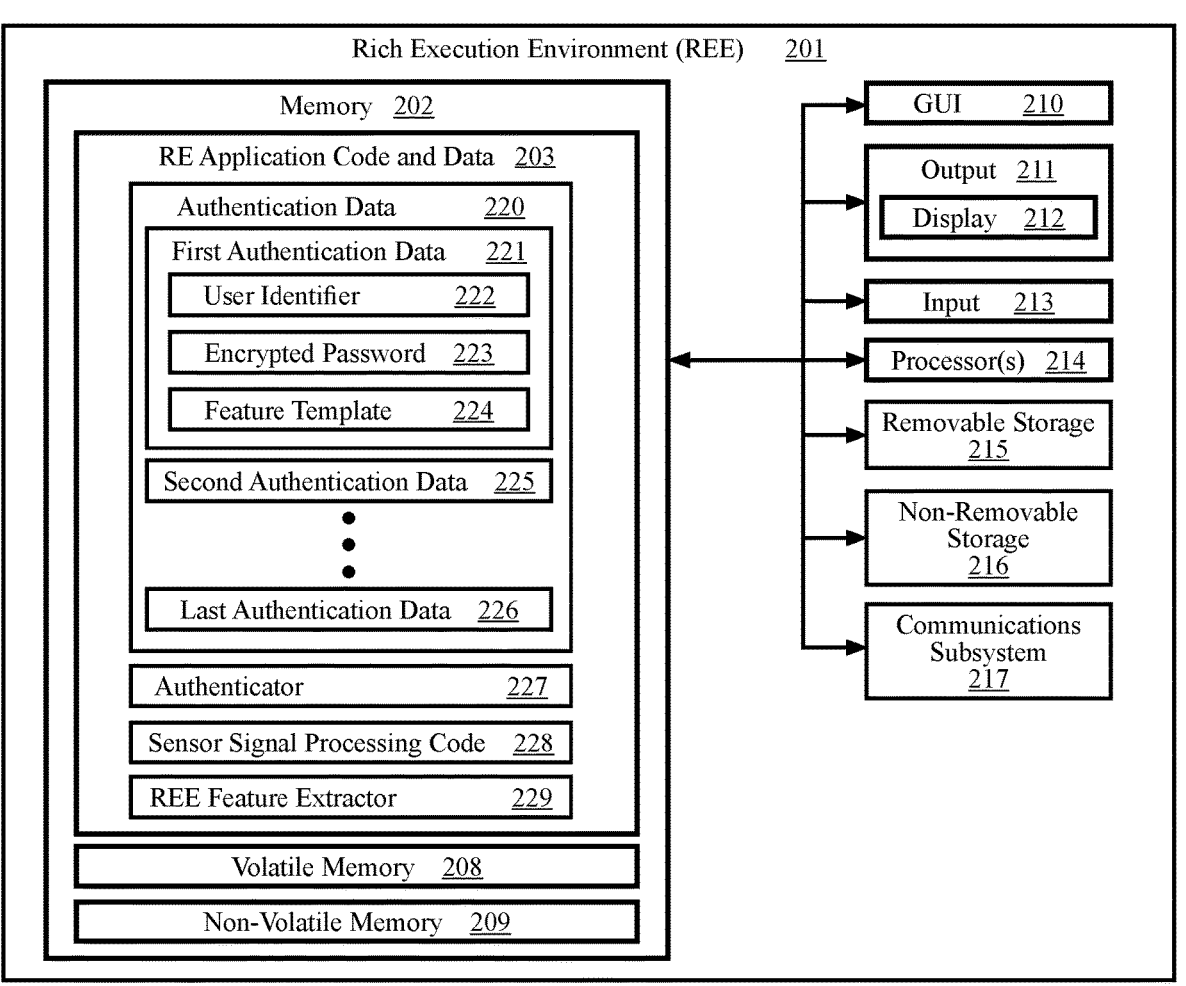
FIG. 2 is a high-level block diagram illustrating a rich execution environment (REE), according to some aspects.

FIG. 2 is a high-level block diagram illustrating a rich execution environment (REE) 201, according to some aspects. An REE 201 in the form of a computer can be configured to interface with controllers, peripheral devices, and other elements may include one or more processors 214, memory 202, removable storage 215, and non-removable storage 216. The one or more processors can be reduced instruction set computer (RISC) or complex instruction set computer (CISC) processors that are operatively coupled to the memory 202 and other hardware elements of the REE 201. Memory 202 may include volatile memory 208 and non-volatile memory 209. The REE 201 may include or have access to a computing environment that includes a variety of transitory and non-transitory computer-readable media such as volatile memory 208 and non-volatile memory 209, removable storage 215 and non-removable storage 216. Computer storage is computer readable medium such as random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

The REE 201 may include, or have access to, a computing environment that includes input 213, output 211, and a communications subsystem 217. The REE 201 may operate in a networked environment using a communications subsystem 217 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 211 is often provided as a computer monitor or display 212, but may be or include any output device. Output 211 and/or input 213 may include a data collection apparatus associated with the REE 201. In addition, input 213, which commonly includes a computer keyboard and/or pointing device such as a computer mouse, computer trackpad, touch screen, or the like, allows a user to select and instruct the REE 201. A user interface can be provided using output 211 and input 213. Output 211 may include a display 212 for displaying data and information for a user, or for interactively displaying a graphical user interface (GUI) 210. A GUI is typically responsive to user inputs entered through input 213 and typically displays images and data on display 212. Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 213 such as, for example, a pointing device such as a mouse, and/or with a keyboard. A particular item can function in the same manner to the user in all applications because the GUI provides standard software routines to handle these elements and report the user's actions.

Computer-readable instructions, also called computer code or application code, can include or be representative of software routines, software subroutines, software objects, etc. Application data can be data that is used by or produced by the execution of computer readable instructions. REE application code and data 203 can be stored on a computer-readable medium for use by or execution by the processor 214 of the REE 201. The REE application code and data 203 can include authentication data 220, an authenticator 227, a sensor signal processing code 228, and a REE feature extractor 229. The authentication data 220 can include a first authentication data 221, a second authentication data 225, and a last authentication data 226. The first authentication data can include a user identifier 222, an encrypted password 223, and a feature template 224. The user identifier 222 can be uniquely associated with a person. The encrypted password 223 may be used for password authentication of that person. The feature template 224 may be used for biometric authentication of that person. The authenticator may implement an authentication process such as the authentication process illustrated in FIG. 1. The sensor signal processing code 228 may perform processes involved with reading the sensor output signal. The REE feature extractor 229 can compute a feature vector from the sensor output signal.

Figure 3:
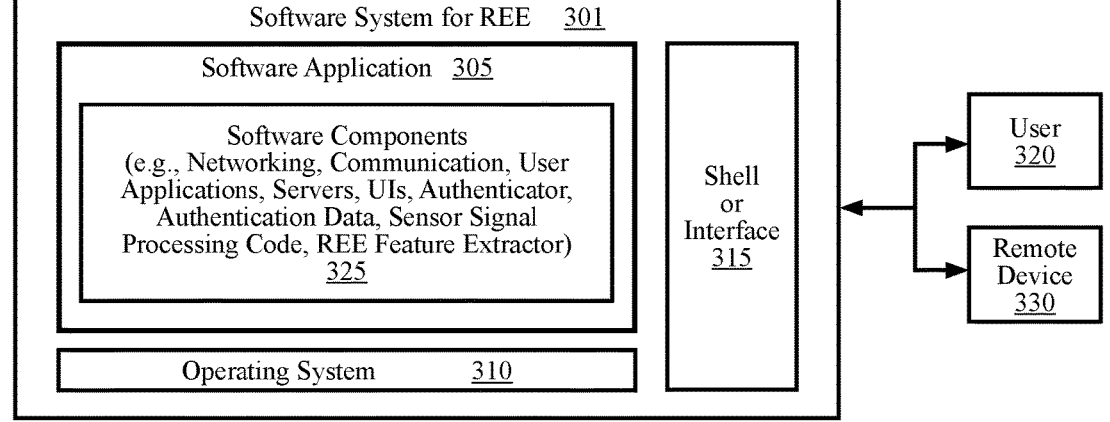
FIG. 3 is a high-level block diagram illustrating a software system for a REE, according to some aspects.

FIG. 3 is a high-level block diagram illustrating a software system for a REE 201, according to some aspects. Software components 325, may be stored in memory 202, on removable storage 215, or on non-removable storage 216, and generally includes and/or is associated with a kernel or operating system 310 and a shell or interface 315. One or more application programs may be "loaded" (i.e., transferred from removable storage 215 or non-removable storage 216 into the memory 202) for execution by the REE 201. A software application 305 can include software components 325 and data such as software modules, software subroutines, software objects, networking code, user application code, server code, user interface code, authenticator code, authentication data, sensor signal processing code, and a REE feature extractor. The REE 201 can receive user commands and data through interface 315, which can include input 213, output 211, and communications subsystem 217 accessible by a user 320 or remote device 330. These inputs may then be acted upon by the REE 201 in accordance with instructions from operating system 310 and/or software application 305 and any software components 325 thereof.

Generally, software components 325 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines, and an implementation, which is typically private (accessible only from within the application or component) and which includes source code that implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 315 can include a graphical user interface 210 that can display results, whereupon a user 320 or remote device 330 may supply additional inputs or terminate a particular session. In some embodiments, operating system 310 and GUI 210 can be implemented in the context of a "windows" system. It can be appreciated, of course, that other types of systems are possible. For example, rather than a traditional windows system, other operating systems such as, for example, a real-time operating system (RTOS) more commonly employed in wireless systems may also be employed with respect to operating system 310 and interface 315. The software application 305 can include, for example, software components 325, which can include instructions for carrying out steps or logical operations such as those shown and described herein.

The description herein is presented with respect to embodiments that can be embodied in the context of, or require the use of, a data-processing system such as REE 201, in conjunction with program code in a REE application code and data 203 in memory 202, software system 301, or REE 201. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the examples which follow are for purposes of illustration and not considered a limitation.

FIG. 4 is a high-level block diagram illustrating a secure element (SE) 401, according to some aspects. It may be observed that the SE 401 has components that are similar to REE 201 components, but fewer of them. The SE 401 is designed for security and, in most cases, includes fewer and smaller components than a REE. For example, the SE processor may be a small embedded processor running code that is stored in a read only memory (e.g., ROM, PROM, EPROM, etc.). An SE 401 may include one or more processors 414, memory 402, removable storage 415, and non-removable storage 416. The one or more processors can be RISC or CISC processors that are operatively coupled to the memory 402 and other hardware elements of the SE 401. Memory 402 may include volatile memory 408 and non-volatile memory 409. The SE 401 may include or have access to a computing environment that includes a variety of transitory and non-transitory computer-readable media such as volatile memory 408 and non-volatile memory 409, removable storage 415 and non-removable storage 416.

The SE 401 may include, or have access to, a computing environment that includes input 413, output 412, and a communications subsystem 417. The SE 401 may use the communications subsystem 417 to connect to the REE. Output 412 and/or input 413 may include a data collection apparatus associated with the SE 401. For example, the SE may use output 412 and input 413 to interface with a sensor such as a biometric sensor.

Computer-readable instructions, also called computer code or application code, can include or be representative of software routines, software subroutines, software objects, etc. Application data can be data that is used by or produced by the execution of computer readable instructions. SE Application code and data 403 can be stored on a computer-readable medium for use by or execution by the processor 414 of the SE 401. The SE application code and data 403 can include historical data 420, replay detector code 427, sensor signal processing code 428, an SE feature extractor 429, and a challenge generator 430. The historical data 420 can include a first historical data 421, a second historical data 425, and a last historical data 426. The first historical data 421 can include a user identifier 422 and previous feature vectors 424. In the illustrated example, the SE can detect replay attacks on a per user basis because previous feature vectors are stored for each user and in association with the user identifiers for those users. In another example, the historical data can include feature vectors that are not associated with a user identifier. In such an example, all of the most recent feature vectors regardless of user may be stored as a single list of feature vectors. The replay detector code 427, sensor signal processing code 428, an SE feature extractor 429, and the challenge generator 430 may be stored in a read only memory (ROM, PROM, EPROM, etc.). For example, the read only memory may be programmed at a secure facility thereby ensuring the security of the code executed by the processor 414.

The SE feature extractor 429 can calculate feature vectors from the sensor output signals. In some examples, the SE 401 has a SE feature extractor, the REE 201 has a REE feature extractor 229, and the two feature extractors may be different algorithms that produce different feature vectors. For example, the SE feature extractor 429 may be a simplified version of the REE feature extractor, may operate on a simplified version of the sensor output signal, or may be in some other way adapted for implementation by a small simple processor. Small simple processors are typically easier to certify as secure than the large complex processors typical of REEs. The challenge generator can generate a challenge. A challenge can be data that is incorporated in or added to the sensor output signal by the sensor or the SE. During subsequent processing, the sensor output signal may be checked to ensure that it includes the challenge or an artifact of the challenge. In this manner, a replay attack may be thwarted because reinjected data could incorporate the wrong challenge or no challenge at all. The sensor signal processing code 428 may perform processes involved with reading the sensor output signal.

FIG. 5 is a high-level block diagram illustrating a software system for a SE 401, according to some aspects. Software components 525, may be stored in memory 402, on removable storage 415, or on non-removable storage 416, and generally includes and/or is associated with a kernel or operating system 510 and a communications interface 515. One or more application programs may be "loaded" for execution by the SE 401. A REE software application 505 can include software components 525 and data such as software modules, software subroutines, software objects, communication code, replay attack detector code, historical data, sensor signal processing code, SE feature extractor code, and challenge generator code. The SE 401 may communicate with the sensor 601 and the REE 201, and external memory 520 through interface 515, which can include input 413, output 412, and communications subsystem 417. These inputs may then be acted upon by the SE 401 in accordance with instructions from operating system 510 and/or software application 505 and any software components 525 thereof. In some examples, operating system 510 can be implemented in the context of an embedded operating system.

The description herein is presented with respect to embodiments that can be embodied in the context of, or require the use of, a data-processing system such as SE 401, in conjunction with program code in a SE application code and data 403 in memory 402, software system 501, or SE 401. The disclosed embodiments, however, are not limited to any particular application or any particular environment. Instead, those skilled in the art will find that the system and method of the present invention may be advantageously applied to a variety of system and application software. Moreover, the present invention may be embodied on a variety of different platforms including Arduino, and the like. Therefore, the examples which follow are for purposes of illustration and not considered a limitation.

Figure 6:
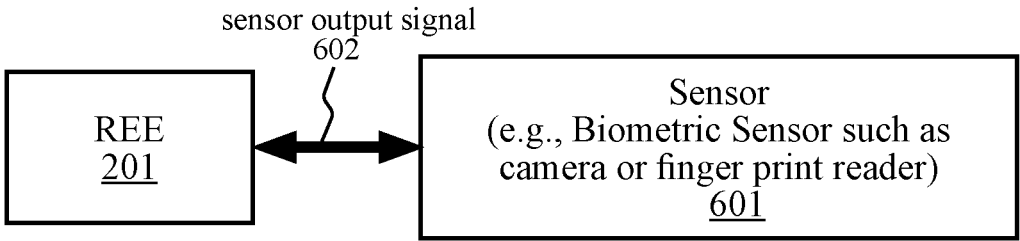
FIG. 6 is a high level block diagram illustrating a REE that can use a sensor output signal for authenticating a user, according to some aspects.

FIG. 6 is a high level block diagram illustrating a REE 201 that can use a sensor output signal 602 for authenticating a user, according to some aspects. This is the base architecture. The sensor 601 (e.g., a biometric sensor) is connected to the REE 201. All the processing is performed by the REE, including all the biometric processing such as enrollment and authentication. Enrollment can include obtaining a feature template 224 for a user and storing the feature template 224 in association with a user identifier 222 for the user. For example, a sensor output signal for the user can be obtained in a controlled environment and a feature vector 604 calculated from sensor output signal. That feature vector 604 can be the feature template 224. In the base architecture of FIG. 6, all the data may be stored in the REE or in storage accessible by the REE (e.g., a storage area network). The base architecture may be considered insecure because it can be subjected to, and compromised by, any of the attacks to which the REE is vulnerable.

Figure 7:
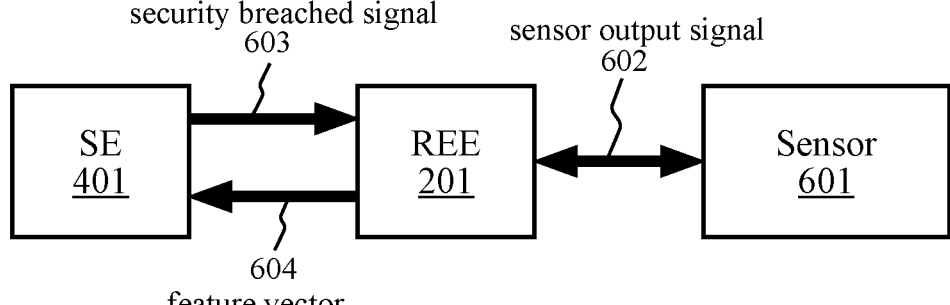
FIG. 7 is a high level block diagram illustrating a REE that can use a SE for authenticating a user, according to some aspects.

FIG. 7 is a high level block diagram illustrating a REE that can use a SE 401 for authenticating a user, according to some aspects. This architecture adds an SE. The SE can be an embedded secure element such as a chip embedded in a passport or credit card. The SE can be secure when the SE is produced and programmed in highly secure environments, resulting in an SE that is secured against manufacturing attacks (attacks introduced during manufacturing) and programming attacks (attacks introduced during the programming of a ROM in the SE). The REE performs all the biometric processing (enrollment and authentication), but may use the SE as a secure vault to store the templates, thereby securing the templates against attack and may sometimes be used to determine whether a feature vector is similar enough to a feature template (e.g., using a distance measure) that the user may be authenticated.

Figure 8:
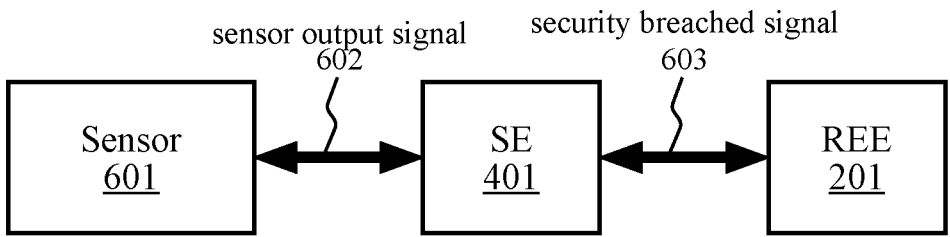
FIG. 8 is a high level block diagram illustrating a REE that can use a security breach signal from an SE for authenticating a user, according to some aspects.

FIG. 8 is a high level block diagram illustrating a REE 201 that can use a security breach signal 603 from an SE 401 for authenticating a user, according to some aspects. In this architecture, the sensor 601 is connected to the SE 401 instead of to the REE 201. In order for this architecture to be practical, the SE must have enough bandwidth to transfer the signal from the sensor to the REE (REE performs authentication and enrollment) or be capable of performing enrollment and/or authentication. Placing the SE in the communications path between the sensor and the REE may improve the security because: 1) the SE may check whether the REE answer matches its own knowledge of the sensor output signal; and 2) the SE may add data (e.g., a challenge such as a watermark in an image) and ensure the data from the REE reflects the challenge (e.g., includes the watermark or a signature of the watermark).

Figure 9:
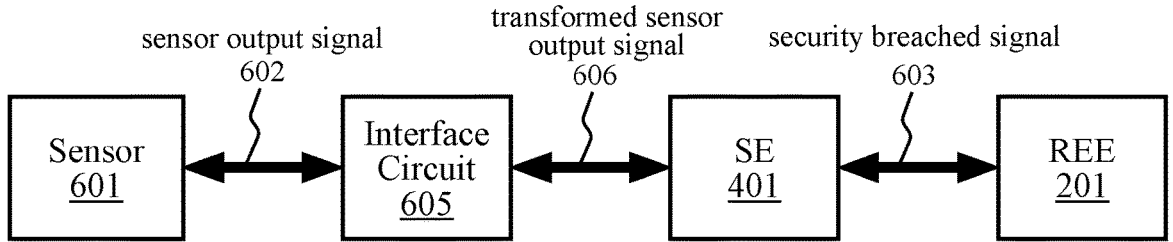
FIG. 9 is a high level block diagram illustrating an interface circuit that conditions the sensor output signal for the SE, according to some aspects.

FIG. 9 is a high level block diagram illustrating an interface circuit 605 that conditions the sensor output signal 602 for the SE, according to some aspects. The interface circuit can condition the sensor output signal 602 by producing a transformed sensor output signal 606. For example, the interface circuit may be connected to the sensor 601 by a parallel bus and may send the sensor output signal to the SE on a serial bus. In this architecture, the functionality of adapting the sensor 601 to the SE 401 can be performed by an interface circuit 605 that may be, or include, a low-end central processing unit (CPU) or microprocessor unit (MPU). This architecture requires less resources from the secure element and offers the same level of protection as previous architecture. For example, fewer resources may be required because a simple and standardized serial input of the SE may be all that is required while the interface circuit 605 deals with the particularities of the sensor 601.

Figure 10:
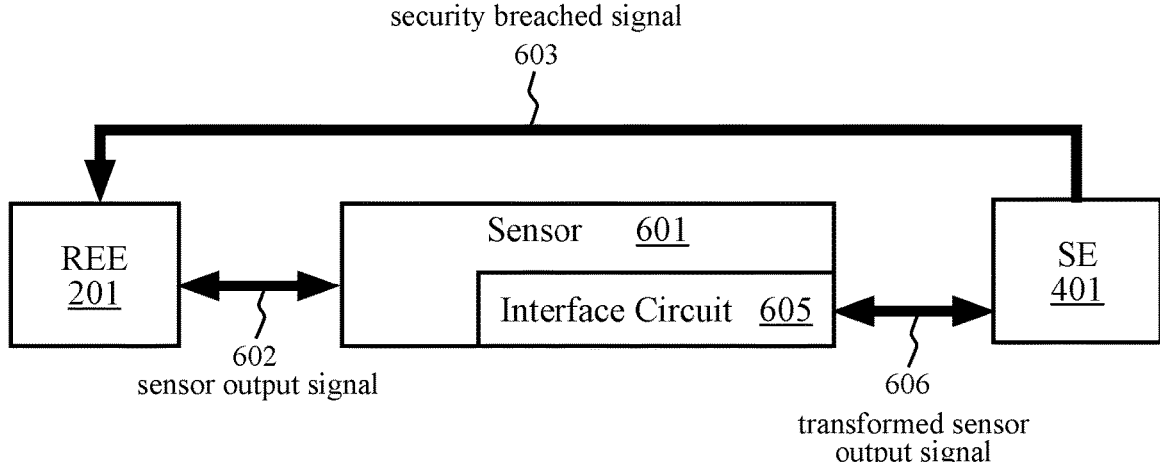
FIG. 10 is a high level block diagram illustrating a sensor that includes an interface circuit and produces a transformed sensor output signal for use by the SE, according to some aspects.

FIG. 10 is a high level block diagram illustrating a sensor 601 that includes an interface circuit 605 and produces a transformed sensor output signal for use by the SE, according to some aspects. The REE may receive the entire sensor output signal. In this architecture, the sensor 601 is connected to both the SE 401 and the REE 201. This means that the SE has a complete or partial knowledge of the signal sent to the REE and may determine whether the information received from the REE by the SE after processing matches the SE's own information. In this architecture, the transformed sensor output signal may omit some of the data that is in the sensor output signal. For example, the sensor output signal may be a 1024 by 768 pixel image and the transformed sensor output signal may be a 256 by 192 pixel image (sensor image is subsampled by four) thereby reducing the SE's computational burden.

FIG. 11 is a high level block diagram illustrating an interface circuit that can provide a sensor output signal to an REE and can provide a transformed sensor output signal to an SE, according to some aspects. The architecture of FIG. 11 places the interface circuit 605 of FIG. 10 outside of the sensor 601. This architecture can occur when it is impractical to incorporate the interface circuit 605 into the sensor 601. In an example, the raw sensor output signal 607 can be the same as the sensor output signal 602. In another example, the interface circuit may transform the raw sensor output signal. A more specific example is that the sensor may produce image data for 1024 by 768 images, the raw sensor output signal 607 may be image data on a parallel bus, the sensor output signal 602 may be the image data on a serial bus, and the transformed sensor output signal 606 may be a subsampling of the 1024 by 768 images (e.g., image data for 256 by 192 images).

FIG. 12 is a high level block diagram illustrating a sensor 601 that can add a challenge 608 to the sensor output signal such that the SE 401 can confirm the challenge, according to some aspects. In this architecture, the sensor 601 is capable of adding a challenge 608 to the sensor output signal 609 sent to the REE 201 and communicates the challenge it has used to the SE 401. After processing of the sensor output signal 609 by the REE, the SE can use challenge checker 611 to check whether the processed data received from the REE matches the expectations associated with the challenge added by the sensor. For example, a watermark may have a distinct frequency domain signature. The frequency domain signature may be included in a challenge indicator 610 sent from the REE to the SE. The challenge checker 611 in the SE may confirm that challenge indicator 610 has the correct frequency domain signature, thereby determining that that the challenge indicator matches the challenge. The challenge indicator matching the challenge indicates that the REE has received the challenge. In another example, the challenge may be a random number and the challenge indicator may be the random number (challenge indicator equal to challenge indicates match) or a function of that random number (e.g., challenge indicator=2 times the challenge plus 3). In this architecture, the challenge is generated by the sensor. For example, the sensor may include a challenge generator such as challenge generator 430. This architecture brings more protection against replay attacks. This architecture may be optimized by using an interface circuit positioned as shown in FIG. 11. The interface circuit 605 may generate the challenge and add the challenge to the sensor output signal and may communicate the challenge to the SE.

FIG. 13 is a high level block diagram illustrating a SE that can provide a challenge to the sensor such that the sensor can add the challenge to the sensor output signal, according to some aspects. In this architecture, the challenge is generated by the SE 401, communicated to the sensor 601, and used by the sensor 601 to alter the sensor output signal 609 that is sent to the REE 201. The SE can check whether the challenge indicator 610 sent by the REE 201 to the SE 401 matches the challenge it has sent to the sensor 601. This architecture may be an improvement over the architecture illustrated in FIG. 12 because the challenge generator 430 in the SE may include a random number generator that is the product of the secure design, manufacturing, and programming facilities that produce SEs.

FIG. 14 is a high level block diagram illustrating a SE 401 that adds a challenge 608 to a sensor output signal 609 and later confirms the challenge, according to some aspects. In this architecture, the SE 401 can receive the raw sensor output signal 607 from the sensor 601, can insert the challenge 608 into the sensor output signal 609 before sending it to the REE 201, and can check that the challenge indicator 610 received back from the REE properly indicates that the REE received the challenge 608 and used the sensor output signal 609 to produce the challenge indicator 610.

FIG. 15 is a high level flow diagram illustrating a process 1500 for detecting a perfect match between a feature vector and a previous feature vector, according to some aspects. This process may be implemented by the SE (e.g., replay detector code 427). After the start, at block 1501 the process can receive a feature vector. At block 1502, the process can set current vector to the first one of the previous feature vectors (e.g., previous feature vectors 424). At block 1503, the process can calculate the distance (e.g., Mahalanobis distance, Euclidean distance, etc.) between the feature vector and the current vector. At decision block 1504, the process can check if the distance equals zero. The distance equals zero when the feature vector equals the current vector. The process can move to block 1505 if the distance equals zero at decision block 1504 and otherwise moves to decision block 1506. At block 1505, the process can send a security breached signal to the REE because a perfect match has been found, thereby indicating a replay attack is in progress. At decision block 1506, the process can check if the current vector is the last one of the previous feature vectors. The process can move to block 1508 if the current vector is the last one of the previous feature vectors at decision block 1506 and otherwise moves to block 1507. At block 1507, the process can set current vector to the next one of the previous feature vectors before looping back to block 1503. At block 1508, the process can send a security intact signal to REE because a replay attack has not been detected.

FIG. 16 is a high-level flow diagram illustrating a method 1600 for detecting replay attacks to an authentication system, according to some aspects. After the start, at block 1601 the method can produce a feature vector from a sensor output signal. At block 1602, the method can store, by a secure element, a plurality of previous feature vectors. At block 1603, the method can send, by the secure element, a security breached signal to a REE in response to determining that the feature vector equals one of the previous feature vectors. At block 1604, the method can store, by the secure element, the feature vector as one of the previous feature vectors. At block 1605, the method can approve or deny authentication, by the REE, based on the sensor output signal, wherein the REE is configured to deny authentication in response to receiving the security breached signal.

Aspects described above can be ultimately implemented in devices that include physical circuits that implement digital data processing, storage, and communications. The devices can include processing circuits, ROM, RAM, and at least one interface (interface(s)). The processors (e.g., CPUs or MPUs) described above can be implemented in processing circuits and memory integrated into the same integrated circuit (IC) device as ASIC circuits. For example, the processors, such as central processing units, and other semiconductor chip circuits can be fabricated on the same semiconductor substrate to form a System-on-Chip (SoC). The devices may be implemented as single IC devices (e.g., fabricated on a single substrate) or the devices may be implemented as systems that include multiple IC devices connected by, for example, a printed circuit board (PCB). The interfaces may include network interfaces (e.g., Ethernet interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. For example, a computer program product can include a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific examples have been described and illustrated, the scope of the claimed systems, methods, devices, etc. is not to be limited to the specific forms or arrangements of parts so described and illustrated. The scope is to be defined by the claims appended hereto and their equivalents.

What is claimed is:

1. A system comprising:
   a rich execution environment (REE) configured to approve or deny authentication based on a sensor output signal;
   a feature extractor configured to produce a feature vector from the sensor output signal; and a secure element operatively coupled to the REE and
   configured to perform an authentication operation and
   to detect a replay attack based on the feature vector,
   wherein detecting the replay attack includes:
   when the feature vector matches one of a plurality of
      feature templates, each feature template associated
      with one of a plurality of authorized users, compar-
      ing the feature template to a plurality of previous
      feature vectors to determine a match;
   when the match is determined, sending a security
      breached signal to the REE; and
   when the match is not determined:
      replacing a selected one of the previous feature
         vectors with the feature vector; and
      continuing the authentication operation;
   wherein the REE is configured to deny authentication in
      response to receiving the security breached signal.
2. The system of claim 1, wherein:
   the REE is configured to implement the feature extractor
      and to send the feature vector to the secure element in
      response to receiving the sensor output signal.
3. The system of claim 1, wherein:
   the secure element is configured to receive the sensor
      output signal and to implement the feature extractor.
4. The system of claim 1, further including:
   an interface circuit operatively coupled to the secure
      element and configured to condition the sensor output
      signal for the secure element, wherein conditioning the
      sensor output signal for the secure element includes:
      receiving the sensor output signal;
      transforming the sensor output signal to produce a
         transformed sensor output signal; and
      providing the transformed sensor output signal to the
         secure element,
   wherein the secure element is configured to receive the
      sensor output signal and to implement the feature
      extractor.
5. The system of claim 1, further including:
   a memory operatively coupled to the secure element; and
   wherein the secure element is configured to store the
      plurality of previous feature vectors in the memory.
6. The system of claim 1, wherein:
   the secure element includes a memory; and
   wherein the secure element is configured to store the
      plurality of previous feature vectors in the memory.
7. The system of claim 1, wherein:
   the REE is configured to approve authentication in
      response to determining that the feature vector does not
      equal any of the previous feature vectors and in
      response to authenticating the sensor output signal.
8. The system of claim 1, further including:
   a biometric sensor configured to produce the sensor
      output signal.
9. A system comprising:
   a sensor configured to produce a sensor output signal;
   an interface circuit configured to transform the sensor
      output signal to produce a transformed sensor output
      signal;
   a rich execution environment (REE) configured to use the
      sensor output signal to approve or to deny authentica-
      tion;
   a feature extractor configured to produce a feature vector
      from the sensor output signal or the transformed sensor
      output signal; and a secure element operatively coupled to the REE and
   configured to perform an authentication operation and
   to detect a replay attack, wherein detecting the replay
   attack includes:
   comparing the feature vector to a plurality of previous
      feature vectors to determine a match;
   when the match is determined, sending a security
      breached signal to the REE; and
   when the match is not determined:
      replacing a selected one of the previous feature
         vectors with the feature vector; and
      continuing the authentication operation; and
   wherein the REE is configured to deny authentication in
      response to receiving the security breached signal.
10. The system of claim 9, wherein:
   the secure element includes the feature extractor; and
   the feature extractor is configured to produce the feature
      vector from the transformed sensor output signal.
11. The system of claim 10, wherein the interface circuit
is operatively coupled to the sensor and to the secure
element.
12. The system of claim 11, wherein:
   the sensor is configured to add a challenge to the sensor
      output signal and to communicate the challenge to the
      secure element;
   the REE is configured to produce a challenge indicator
      from the challenge;
   the secure element is configured to use the challenge to
      confirm the challenge indicator; and
   the secure element is configured to send the security
      breached signal to the REE in response to determining
      that the challenge does not match the challenge indi-
      cator.
13. The system of claim 12, further including:
   a memory operatively coupled to the secure element; and
   wherein the secure element is configured to store the
      plurality of previous feature vectors in the memory.
14. The system of claim 10, wherein the sensor includes
the interface circuit.
15. The system of claim 9, wherein:
   the REE includes the feature extractor; and
   the feature extractor is configured to produce the feature
      vector from the sensor output signal and to provide the
      feature vector to the secure element.
16. The system of claim 15, wherein the sensor is a
biometric sensor.
17. The system of claim 16, wherein the biometric sensor
is a camera.
18. A method for denying authentication in response to
detecting a replay attack, the method comprising:
   producing a feature vector from a sensor output signal;
   comparing, by a secure element, the feature vector to a
      plurality of previous feature vectors in a memory to
      determine a match;
   in response to determining the match, sending, by the
      secure element, a security breached signal to a REE;
   when the match is not determined, storing, by the secure
      element, the feature vector to replace a selected one of
      the previous feature vectors; and
   wherein the REE is configured to deny authentication in
      response to receiving the security breached signal.
19. The method of claim 18, further including:
   producing, by a sensor, the sensor output signal; and
   transforming, by an interface circuit, the sensor output
      signal to produce a transformed sensor output signal
      that is provided to the secure element, wherein the secure element uses the transformed sensor output signal to produce the feature vector.

20. The method of claim 18, wherein:

the REE is configured to approve authentication in response to determining that the feature vector does not equal any of the plurality of previous feature vectors and in response to authenticating the sensor output signal.

\* \* \* \* \*